United States Patent
Usoro

(10) Patent No.: US 7,625,307 B2
(45) Date of Patent: *Dec. 1, 2009

(54) MECHATRONIC HYBRID TRANSMISSIONS HAVING TWO PLANETARY GEAR SETS AND THREE MOTOR/GENERATORS

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 57 days.

This patent is subject to a terminal disclaimer.

(21) Appl. No.: 11/352,901

(22) Filed: Feb. 13, 2006

(65) Prior Publication Data

US 2007/0093335 A1  Apr. 26, 2007

Related U.S. Application Data

(60) Provisional application No. 60/728,895, filed on Oct. 21, 2005.

(51) Int. Cl.
F16H 3/72 (2006.01)
(52) U.S. Cl. .......................................... 475/5
(58) Field of Classification Search ........................ 475/5
See application file for complete search history.

(56) References Cited

U.S. PATENT DOCUMENTS

| 5,168,946 | A | * | 12/1992 | Dorgan | 180/6.44 |
|---|---|---|---|---|---|
| 5,558,595 | A | | 9/1996 | Schmidt et al. | 477/3 |
| 5,931,757 | A | | 8/1999 | Schmidt | 475/2 |
| 6,478,705 | B1 | | 11/2002 | Holmes et al. | 475/5 |
| 6,527,658 | B2 | | 3/2003 | Holmes et al. | 475/5 |
| 7,140,461 | B2 | * | 11/2006 | Morrow | 180/65.2 |
| 7,195,573 | B2 | * | 3/2007 | Bezian et al. | 475/5 |
| 7,395,889 | B2 | * | 7/2008 | Sugiyama et al. | 180/65.2 |
| 2006/0011395 | A1 | * | 1/2006 | Sugiyama et al. | 180/65.4 |
| 2007/0049439 | A1 | * | 3/2007 | Garnett | 475/5 |

FOREIGN PATENT DOCUMENTS

| JP | 2003032802 A | * | 1/2003 |
| JP | 2003164007 A | * | 6/2003 |
| JP | 2004336983 A | * | 11/2004 |
| JP | 2005006406 A | * | 1/2005 |
| JP | 2005138802 A | * | 6/2005 |

* cited by examiner

Primary Examiner—Ha D. Ho

(57) ABSTRACT

An electrically variable transmission family providing low-content, low-cost electrically variable transmission mechanisms including first and second differential gear sets, a battery and three electric machines serving interchangeably as motors or generators. The three motor/generators are operable in a coordinated fashion to yield an EVT with a continuously variable range of speeds (including reverse).

19 Claims, 7 Drawing Sheets

RING GEAR/SUN GEAR TOOTH RATIO: R1/S1 = 2.0, R2/S2 = 2.0

RING GEAR/SUN GEAR TOOTH RATIO: R1/S1 = 1.8, R2/S2 = 2.0

RING GEAR/SUN GEAR TOOTH RATIO: R1/S1 = 1.8, R2/S2 = 2.2

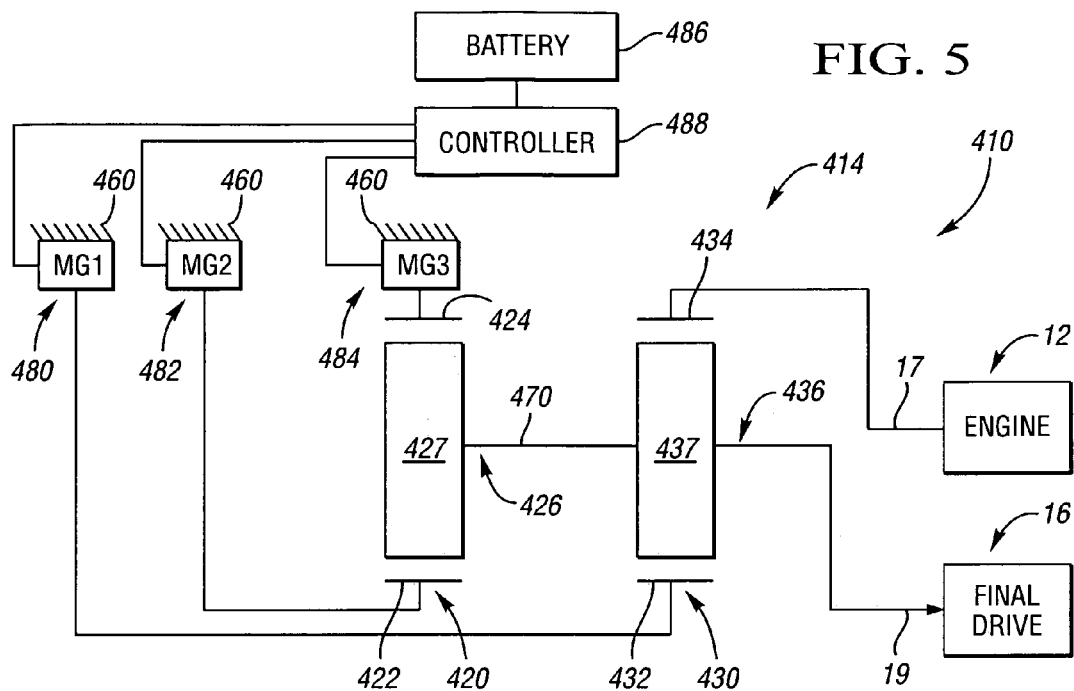
RING GEAR/SUN GEAR TOOTH RATIO: R1/S1 = 2.0, R2/S2 = 2.4
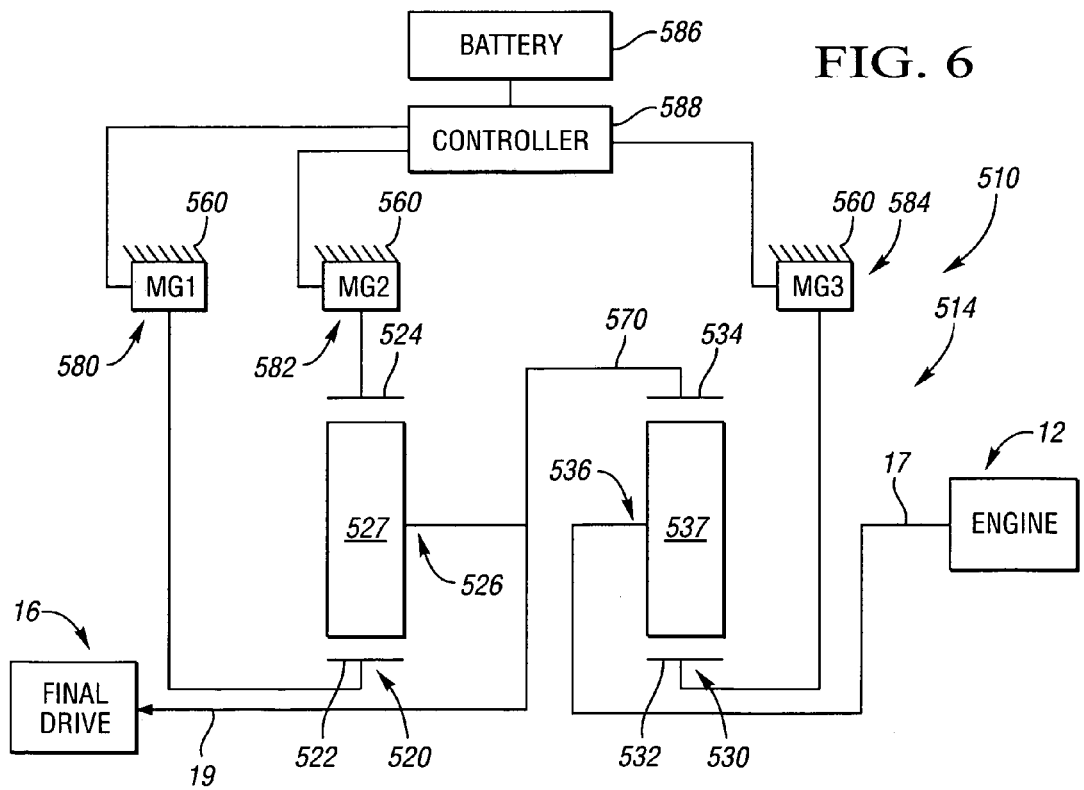
RING GEAR/SUN GEAR TOOTH RATIO: R1/S1 = 2.2, R2/S2 = 1.8

RING GEAR/SUN GEAR TOOTH RATIO: R1/S1 = 2.2, R2/S2 = 2.0

RING GEAR/SUN GEAR TOOTH RATIO: R1/S1 = 2.0, R2/S2 = 1.5

RING GEAR/SUN GEAR TOOTH RATIO: R1/S1 = 2.0, R2/S2 = 1.8

RING GEAR/SUN GEAR TOOTH RATIO: R1/S1 = 2.5, R2/S2 = 2.0

RING GEAR/SUN GEAR TOOTH RATIO: R1/S1 = 2.0, R2/S2 = 2.2

RING GEAR/SUN GEAR TOOTH RATIO: R1/S1 = 2.2, R2/S2 = 2.0

US 7,625,307 B2

MECHATRONIC HYBRID TRANSMISSIONS HAVING TWO PLANETARY GEAR SETS AND THREE MOTOR/GENERATORS

CROSS-REFERENCE TO RELATED APPLICATIONS

This application claims priority to U.S. Provisional Patent Application No. 60/728,895 filed on Oct. 21, 2005, and which is hereby incorporated by reference in its entirety.

TECHNICAL FIELD

The present invention relates to electrically variable transmissions having two planetary gear sets and three motor/generators that are controllable to provide continuously variable speed ratio ranges.

BACKGROUND OF THE INVENTION

Electric hybrid vehicles offer the potential for significant fuel economy improvements over their conventional counterparts; however, their overall efficiency is limited by parasitic losses. In single-mode electric variable transmissions (EVT) these losses are mostly attributed to electric machines rotating at high speeds. Two-mode EVTs offer the advantage of reduced motor-generator speeds, but often suffer losses attributed to high-pressure hydraulic pump and clutches needed for mode switching. Significant vehicle fuel economy gains can be realized if the losses associated with high-pressure hydraulic pump, clutches and high motor-generator speeds are substantially eliminated.

SUMMARY OF THE INVENTION

This invention describes continuously-variable mechatronic hybrid transmissions that offer the advantages of multimode EVTs without the need for clutches and the associated high pressure hydraulic pump.

The electrically variable transmission family of the present invention provides low-content, low-cost electrically variable transmission mechanisms including first and second differential gear sets, a battery (or similar energy storage device) and three electric machines serving interchangeably as motors or generators. Preferably, the differential gear sets are planetary gear sets, but other gear arrangements may be implemented, such as bevel gears or differential gearing to an offset axis.

In this description, the first and second planetary gear sets may be counted first to second in any order (i.e., left to right, right to left).

Each of the two planetary gear sets has three members. The first, second or third member of each planetary gear set can be any one of a sun gear, ring gear or carrier, or alternatively a pinion.

Each carrier can be either a single-pinion carrier (simple) or a double-pinion carrier (compound).

The input shaft is continuously connected with a member of the planetary gear sets. The output shaft is continuously connected with another member of the planetary gear sets.

An interconnecting member continuously connects the first member of the first planetary gear set with the first member of the second planetary gear set.

A first motor/generator is connected to a member of the first planetary gear set.

A second motor/generator is connected to a member of the second planetary gear set.

A third motor/generator is connected to a member of the first or second planetary gear set.

In essence, the planetary gear arrangement has five nodes which are connected with the input shaft, output shaft and three motor/generators. The electric motor/generators are connected with drive units, control system and energy storage devices, such as a battery.

The three motor/generators are operated in a coordinated fashion to yield continuously variable forward and reverse speed ratios between the input shaft and the output shaft, while minimizing the rotational speeds of the motor-generators and optimizing the overall efficiency of the system. The tooth ratios of the planetary gear sets can be suitably selected to match specific applications.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic representation of a powertrain of a fifth embodiment including an electrically variable transmission incorporating a family member of the present invention;

FIG. 6 is a schematic representation of a powertrain of a sixth embodiment including an electrically variable transmission incorporating a family member of the present invention;

DESCRIPTION OF THE PREFERRED EMBODIMENTS

Figure 1:
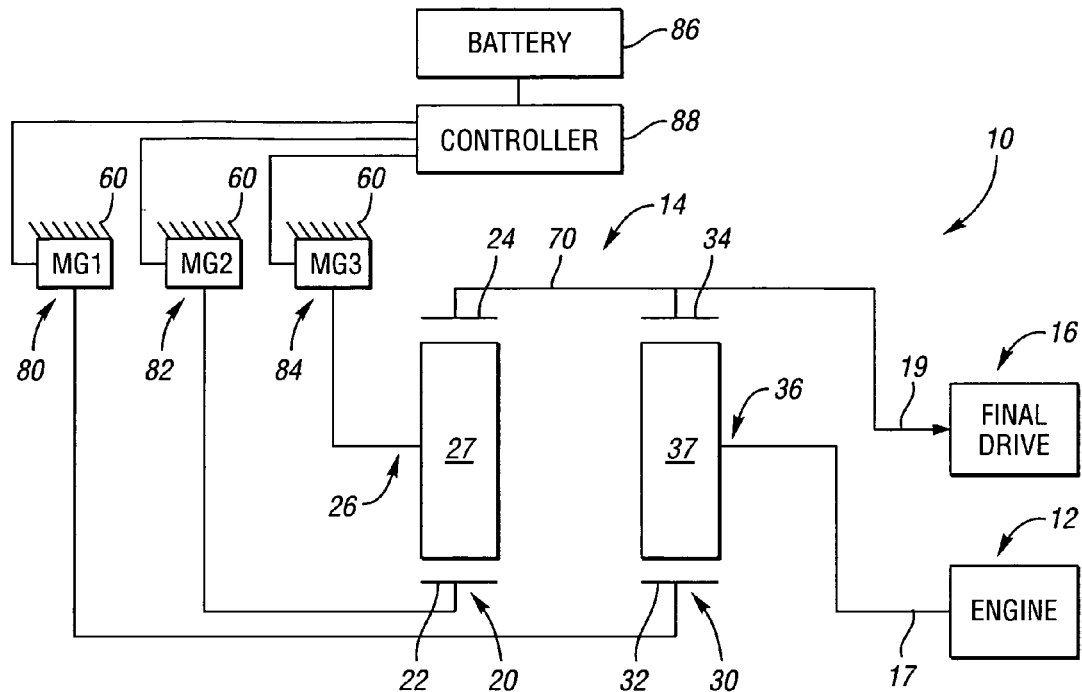
FIG. 1 is a schematic representation of a powertrain of a first embodiment including an electrically variable transmission incorporating a family member of the present invention.

With reference to FIG. 1, a powertrain 10 is shown, including an engine 12 connected to one preferred embodiment of the improved electrically variable transmission (EVT), designated generally by the numeral 14. Transmission 14 is designed to receive at least a portion of its driving power from the engine 12. As shown, the engine 12 has an output shaft that serves as the input member 17 of the transmission 14. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 14.

An output member 19 of the transmission 14 is connected to a final drive 16.

The transmission 14 utilizes two differential gear sets, preferably in the nature of planetary gear sets 20 and 30. The planetary gear set 20 employs an outer gear member 24, typically designated as the ring gear. The ring gear member 24 circumscribes an inner gear member 22, typically designated as the sun gear. A carrier member 26 rotatably supports a plurality of planet gears 27 such that each planet gear 27 simultaneously, and meshingly engages both the outer, ring gear member 24 and the inner, sun gear member 22 of the first planetary gear set 20.

The planetary gear set 30 also employs an outer gear member 34, typically designated as the ring gear. The ring gear member 34 circumscribes an inner gear member 32, typically designated as the sun gear. A carrier member 36 rotatably supports a plurality of planet gears 37 such that each planet gear 37 simultaneously, and meshingly engages both the outer, ring gear member 34 and the inner, sun gear member 32 of the planetary gear set 30.

The input shaft 17 is continuously connected to the carrier member 36 of the planetary gear set 30. The output shaft 19 is continuously connected to the ring gear member 34 of the planetary gear set 30.

An interconnecting member 70 continuously connects the ring gear member 24 of the planetary gear set 20 with the ring gear member 34 of the planetary gear set 30.

The first preferred embodiment 10 also incorporates first, second and third motor/generators 80, 82 and 84, respectively. The stator of the first motor/generator 80 is secured to the transmission housing 60. The rotor of the first motor/generator 80 is secured to the sun gear member 32 of the planetary gear set 30.

The stator of the second motor/generator 82 is secured to the transmission housing 60. The rotor of the second motor/generator 82 is secured to the sun gear member 22 of the planetary gear set 20.

The stator of the third motor/generator 84 is secured to the transmission housing 60. The rotor of the third motor/generator 84 is secured to the carrier member 26 of the planetary gear set 20.

Returning now to the description of the power sources, it should be apparent from the foregoing description, and with particular reference to FIG. 1, that the transmission 14 selectively receives power from the engine 12. The hybrid transmission also receives power from an electric power source 86, which is operably connected to a controller 88. The electric power source 86 may be one or more batteries. Other electric power sources, such as capacitors or fuel cells, that have the ability to provide, or store, and dispense electric power may be used in place of or in combination with batteries without altering the concepts of the present invention. The speed ratio between the input shaft and output shaft is prescribed by the speeds of the three motor/generators and the ring gear/sun gear tooth ratios of the planetary gear sets. Those with ordinary skill in the transmission art will recognize that desired input/output speed ratios can be realized by suitable selection of the speeds of the three motor/generators.

Description of a Second Exemplary Embodiment

Figure 2:
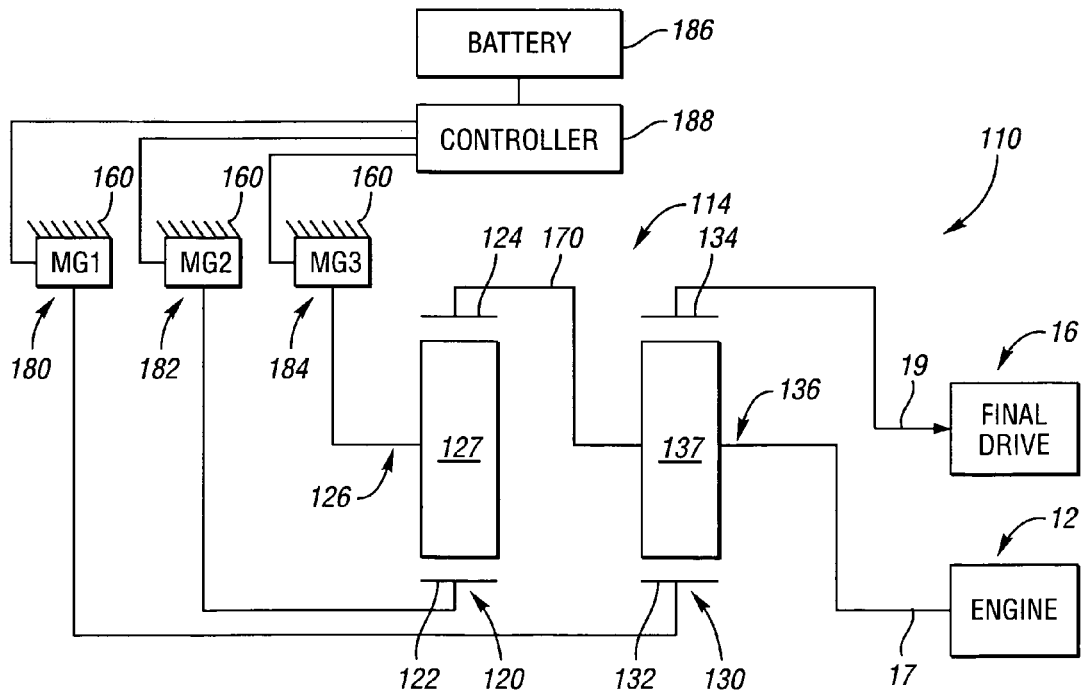
FIG. 2 is a schematic representation of a powertrain of a second embodiment including an electrically variable transmission incorporating a family member of the present invention.

With reference to FIG. 2, a powertrain 110 is shown, including an engine 12 connected to one preferred embodiment of the improved electrically variable transmission (EVT), designated generally by the numeral 114. Transmission 114 is designed to receive at least a portion of its driving power from the engine 12. As shown, the engine 12 has an output shaft that serves as the input member 17 of the transmission 114. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 114.

An output member 19 of the transmission 114 is connected to a final drive 16.

The transmission 114 utilizes two differential gear sets, preferably in the nature of planetary gear sets 120 and 130. The planetary gear set 120 employs an outer gear member 124, typically designated as the ring gear. The ring gear member 124 circumscribes an inner gear member 122, typically designated as the sun gear. A carrier member 126 rotatably supports a plurality of planet gears 127 such that each planet gear 127 simultaneously, and meshingly engages both the outer, ring gear member 124 and the inner, sun gear member 122 of the first planetary gear set 120.

The planetary gear set 130 also employs an outer gear member 134, typically designated as the ring gear. The ring gear member 134 circumscribes an inner gear member 132, typically designated as the sun gear. A carrier member 136 rotatably supports a plurality of planet gears 137 such that each planet gear 137 simultaneously, and meshingly engages both the outer, ring gear member 134 and the inner, sun gear member 132 of the planetary gear set 130.

The input shaft 17 is continuously connected to the carrier member 136 of the planetary gear set 130. The output shaft 19 is continuously connected to the ring gear member 134 of the planetary gear set 130.

An interconnecting member 170 continuously connects the ring gear member 124 of the planetary gear set 120 with the carrier member 136 of the planetary gear set 130.

The second preferred embodiment 110 also incorporates first, second and third motor/generators 180, 182 and 184, respectively. The stator of the first motor/generator 180 is secured to the transmission housing 160. The rotor of the first motor/generator 180 is secured to the sun gear member 132 of the planetary gear set 130.

The stator of the second motor/generator 182 is secured to the transmission housing 160. The rotor of the second motor/generator 182 is secured to the sun gear member 122 of the planetary gear set 120.

The stator of the third motor/generator 184 is secured to the transmission housing 160. The rotor of the third motor/generator 184 is secured to the carrier member 126 of the planetary gear set 120.

The hybrid transmission 114 receives power from the engine 12, and also exchanges power with an electric power source 186, which is operably connected to a controller 188.

Description of a Third Exemplary Embodiment

Figure 3:
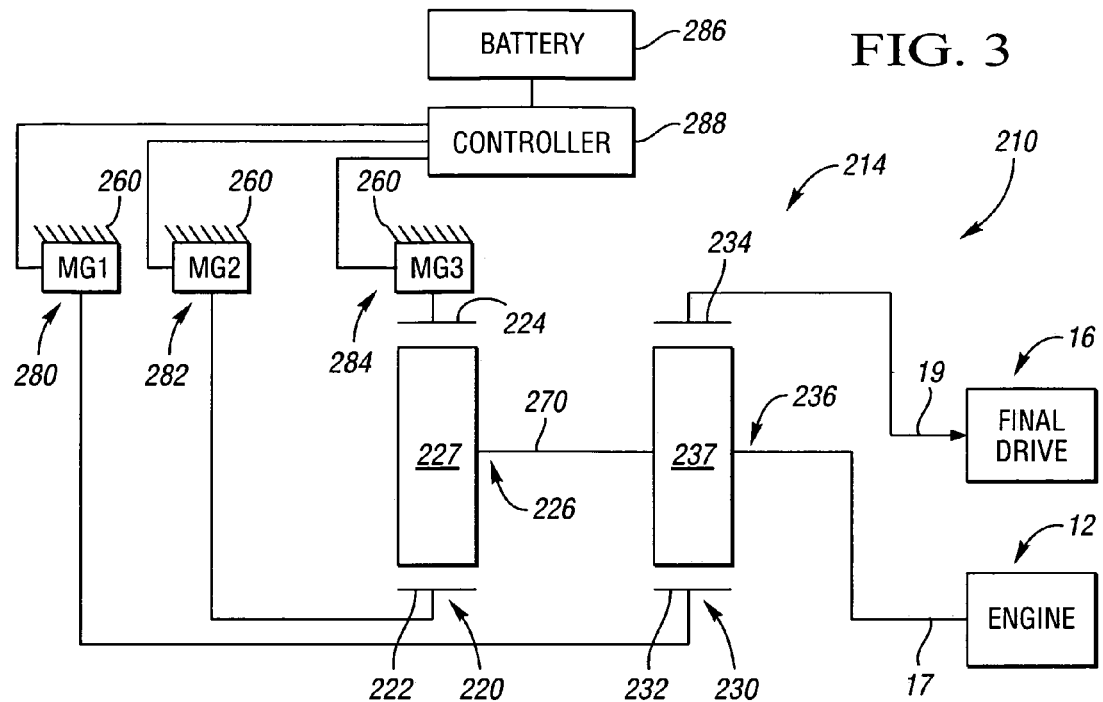
FIG. 3 is a schematic representation of a powertrain of a third embodiment including an electrically variable transmission incorporating a family member of the present invention.

With reference to FIG. 3, a powertrain 210 is shown, including an engine 12 connected to one preferred embodiment of the improved electrically variable transmission (EVT), designated generally by the numeral 214. Transmission 214 is designed to receive at least a portion of its driving power from the engine 12. As shown, the engine 12 has an output shaft that serves as the input member 17 of the transmission 214. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 214.

An output member 19 of the transmission 214 is connected to a final drive 16.

The transmission 214 utilizes two differential gear sets, preferably in the nature of planetary gear sets 220 and 230. The planetary gear set 220 employs an outer gear member 224, typically designated as the ring gear. The ring gear member 224 circumscribes an inner gear member 222, typically designated as the sun gear. A carrier member 226 rotatably supports a plurality of planet gears 227 such that each planet gear 227 simultaneously, and meshingly engages both the outer, ring gear member 224 and the inner, sun gear member 222 of the first planetary gear set 220.

The planetary gear set 230 also employs an outer gear member 234, typically designated as the ring gear. The ring gear member 234 circumscribes an inner gear member 232, typically designated as the sun gear. A carrier member 236 rotatably supports a plurality of planet gears 237 such that each planet gear 237 simultaneously, and meshingly engages both the outer, ring gear member 234 and the inner, sun gear member 232 of the planetary gear set 230.

The input shaft 17 is continuously connected to the carrier member 236 of the planetary gear set 230. The output shaft 19 is continuously connected to the ring gear member 234 of the planetary gear set 230.

An interconnecting member 270 continuously connects the carrier member 226 with the carrier member 236.

The preferred embodiment 210 also incorporates first, second and third motor/generators 280, 282 and 284, respectively. The stator of the first motor/generator 280 is secured to the transmission housing 260. The rotor of the first motor/generator 280 is secured to the sun gear member 232 of the planetary gear set 230.

The stator of the second motor/generator 282 is secured to the transmission housing 260. The rotor of the second motor/generator 282 is secured to the sun gear member 222 of the planetary gear set 220.

The stator of the third motor/generator 284 is secured to the transmission housing 260. The rotor of the third motor/generator 284 is secured to the ring gear member 224 of the planetary gear set 220.

The hybrid transmission 214 receives power from the engine 12, and also exchanges power with an electric power source 286, which is operably connected to a controller 288.

Description of a Fourth Exemplary Embodiment

Figure 4:
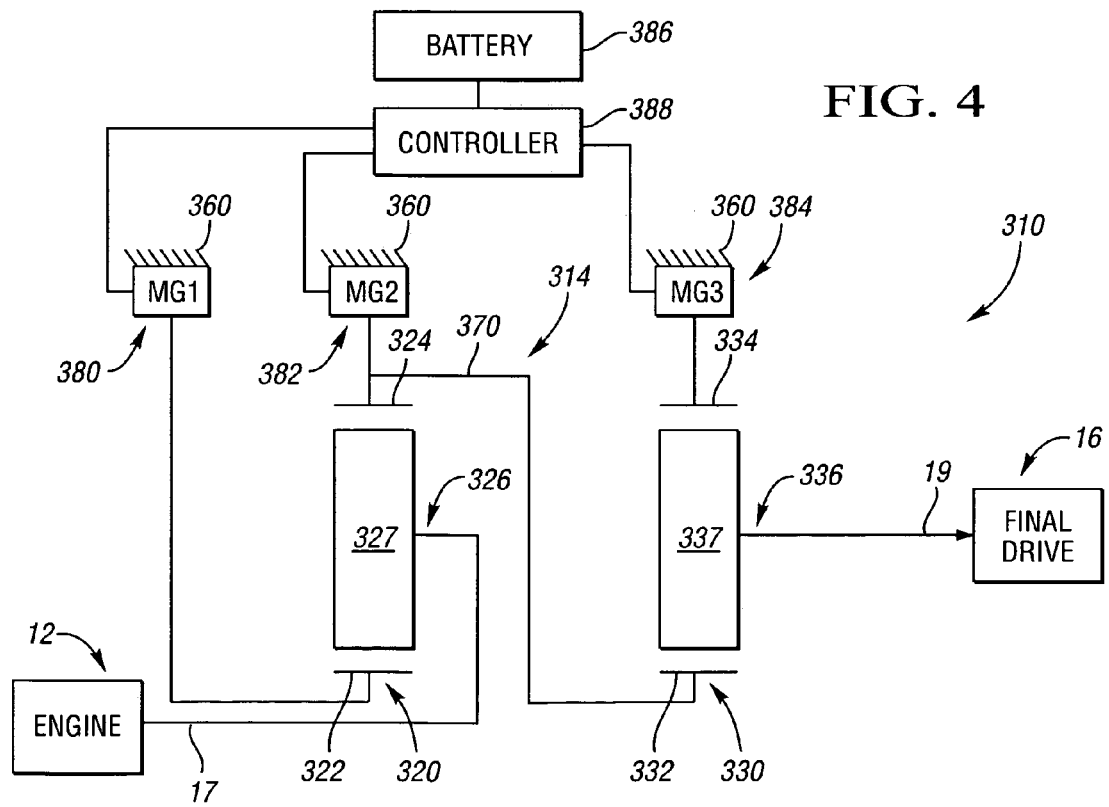
FIG. 4 is a schematic representation of a powertrain of a fourth embodiment including an electrically variable transmission incorporating a family member of the present invention.

With reference to FIG. 4, a powertrain 310 is shown, including an engine 12 connected to one preferred embodiment of the improved electrically variable transmission (EVT), designated generally by the numeral 314. Transmission 314 is designed to receive at least a portion of its driving power from the engine 12. As shown, the engine 12 has an output shaft that serves as the input member 17 of the transmission 314. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 14. An output member 19 of the transmission 314 is connected to a final drive 16.

The transmission 314 utilizes two differential gear sets, preferably in the nature of planetary gear sets 320 and 330. The planetary gear set 320 employs an outer gear member 324, typically designated as the ring gear. The ring gear member 324 circumscribes an inner gear member 322, typically designated as the sun gear. A carrier member 326 rotatably supports a plurality of planet gears 327 such that each planet gear 327 simultaneously, and meshingly engages both the outer, ring gear member 324 and the inner, sun gear member 322 of the first planetary gear set 320.

The planetary gear set 330 also employs an outer gear member 334, typically designated as the ring gear. The ring gear member 334 circumscribes an inner gear member 332, typically designated as the sun gear. A carrier member 336 rotatably supports a plurality of planet gears 337 such that each planet gear 337 simultaneously, and meshingly engages both the outer, ring gear member 334 and the inner, sun gear member 332 of the planetary gear set 330.

The input shaft 17 is continuously connected to the carrier member 326 of the planetary gear set 320. The output shaft 19 is continuously connected to the carrier member 336 of the planetary gear set 330.

An interconnecting member 370 continuously connects the ring gear member 324 with the sun gear member 332.

The preferred embodiment 310 also incorporates first, second and third motor/generators 380, 382 and 384, respectively. The stator of the first motor/generator 380 is secured to the transmission housing 360. The rotor of the first motor/generator 380 is secured to the sun gear member 322.

The stator of the second motor/generator 382 is secured to the transmission housing 360. The rotor of the second motor/generator 382 is secured to the ring gear member 324.

The stator of the third motor/generator 384 is secured to the transmission housing 360. The rotor of the third motor/generator 384 is secured to the ring gear member 334.

The hybrid transmission 314 receives power from the engine 12, and also exchanges power with an electric power source 386, which is operably connected to a controller 388.

Description of a Fifth Exemplary Embodiment

With reference to FIG. 5, a powertrain 410 is shown, including an engine 12 connected to one preferred embodiment of the improved electrically variable transmission (EVT), designated generally by the numeral 414. Transmission 414 is designed to receive at least a portion of its driving power from the engine 12. As shown, the engine 12 has an output shaft that serves as the input member 17 of the transmission 414. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 414. An output member 19 of the transmission 414 is connected to a final drive 16.

The transmission 414 utilizes two differential gear sets, preferably in the nature of planetary gear sets 420 and 430. The planetary gear set 420 employs an outer gear member 424, typically designated as the ring gear. The ring gear member 424 circumscribes an inner gear member 422, typically designated as the sun gear. A carrier member 426 rotatably supports a plurality of planet gears 427 such that each planet gear 427 simultaneously, and meshingly engages both the outer, ring gear member 424 and the inner, sun gear member 422 of the first planetary gear set 420.

The planetary gear set 430 also employs an outer gear member 434, typically designated as the ring gear. The ring gear member 434 circumscribes an inner gear member 432, typically designated as the sun gear. A carrier member 436 rotatably supports a plurality of planet gears 437 such that each planet gear 437 simultaneously, and meshingly engages both the outer, ring gear member 434 and the inner, sun gear member 432 of the planetary gear set 430.

The input shaft 17 is continuously connected to the ring gear member 434. The output shaft 19 is continuously connected to the carrier member 436.

An interconnecting member 470 continuously connects the carrier member 426 with the carrier member 436.

The preferred embodiment 410 also incorporates first, second and third motor/generators 480, 482 and 484, respectively. The stator of the first motor/generator 480 is secured to the transmission housing 460. The rotor of the first motor/generator 480 is secured to the sun gear member 432.

The stator of the second motor/generator 482 is secured to the transmission housing 460. The rotor of the second motor/generator 482 is secured to the sun gear member 422.

The stator of the third motor/generator 484 is secured to the transmission housing 460. The rotor of the third motor/generator 484 is secured to the ring gear member 424.

The hybrid transmission 414 receives power from the engine 12, and also exchanges power with an electric power source 486, which is operably connected to a controller 488.

Description of a Sixth Exemplary Embodiment

With reference to FIG. 6, a powertrain 510 is shown, including an engine 12 connected to one preferred embodiment of the improved electrically variable transmission (EVT), designated generally by the numeral 514. Transmission 514 is designed to receive at least a portion of its driving power from the engine 12. As shown, the engine 12 has an output shaft that serves as the input member 17 of the transmission 514. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 514. An output member 19 of the transmission 514 is connected to a final drive 16.

The transmission 514 utilizes two differential gear sets, preferably in the nature of planetary gear sets 520 and 530. The planetary gear set 520 employs an outer gear member 524, typically designated as the ring gear. The ring gear member 524 circumscribes an inner gear member 522, typically designated as the sun gear. A carrier member 526 rotatably supports a plurality of planet gears 527 such that each planet gear 527 simultaneously, and meshingly engages both the outer, ring gear member 524 and the inner, sun gear member 522 of the planetary gear set 520.

The planetary gear set 530 also employs an outer gear member 534, typically designated as the ring gear. The ring gear member 534 circumscribes an inner gear member 532, typically designated as the sun gear. A carrier member 536 rotatably supports a plurality of planet gears 537 such that each planet gear 537 simultaneously, and meshingly engages both the outer, ring gear member 534 and the inner, sun gear member 532 of the planetary gear set 530.

The input shaft 17 is continuously connected to the carrier member 536. The output shaft 19 is continuously connected to the carrier member 526.

An interconnecting member 570 continuously connects the carrier member 526 with the ring gear member 534.

The preferred embodiment 510 also incorporates first, second and third motor/generators 580, 582 and 584, respectively. The stator of the first motor/generator 580 is secured to the transmission housing 560. The rotor of the first motor/generator 580 is secured to the sun gear member 522.

The stator of the second motor/generator 582 is secured to the transmission housing 560. The rotor of the second motor/generator 582 is secured to the ring gear member 524.

The stator of the third motor/generator 584 is secured to the transmission housing 560. The rotor of the third motor/generator 584 is secured to the sun gear member 532.

The hybrid transmission 514 receives power from the engine 12, and also exchanges power with an electric power source 586, which is operably connected to a controller 588.

Description of a Seventh Exemplary Embodiment

Figure 7:
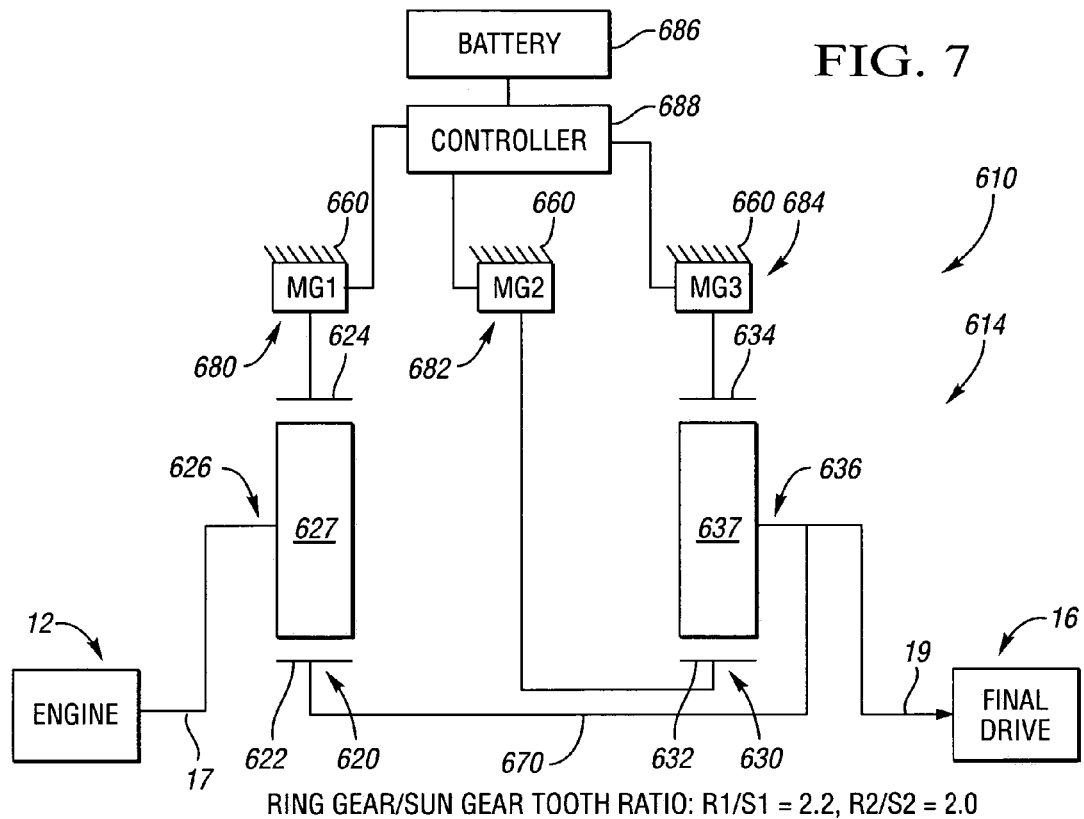
FIG. 7 is a schematic representation of a powertrain of a seventh embodiment including an electrically variable transmission incorporating a family member of the present invention.

With reference to FIG. 7, a powertrain 610 is shown, including an engine 12 connected to one preferred embodiment of the improved electrically variable transmission (EVT), designated generally by the numeral 614. Transmission 614 is designed to receive at least a portion of its driving power from the engine 12. As shown, the engine 12 has an output shaft that serves as the input member 17 of the transmission 614. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 614. An output member 19 of the transmission 614 is connected to a final drive 16.

The transmission 614 utilizes two differential gear sets, preferably in the nature of planetary gear sets 620 and 630. The planetary gear set 620 employs an outer gear member 624, typically designated as the ring gear. The ring gear member 624 circumscribes an inner gear member 622, typically designated as the sun gear. A carrier member 626 rotatably supports a plurality of planet gears 627 such that each planet gear 627 simultaneously, and meshingly engages both the outer, ring gear member 624 and the inner, sun gear member 622 of the first planetary gear set 620.

The planetary gear set 630 also employs an outer gear member 634, typically designated as the ring gear. The ring gear member 634 circumscribes an inner gear member 632, typically designated as the sun gear. A carrier member 636 rotatably supports a plurality of planet gears 637 such that each planet gear 637 simultaneously, and meshingly engages both the outer, ring gear member 634 and the inner, sun gear member 632 of the planetary gear set 630.

The input shaft 17 is continuously connected to the carrier member 626. The output shaft 19 is continuously connected to the carrier member 636.

An interconnecting member 670 continuously connects the sun gear member 622 with the carrier member 636.

The preferred embodiment 610 also incorporates first, second and third motor/generators 680, 682 and 684, respectively. The stator of the first motor/generator 680 is secured to the transmission housing 660. The rotor of the first motor/generator 680 is secured to the ring gear member 624.

The stator of the second motor/generator 682 is secured to the transmission housing 660. The rotor of the second motor/generator 682 is secured to the sun gear member 632.

The stator of the third motor/generator 684 is secured to the transmission housing 660. The rotor of the third motor/generator 684 is secured to the ring gear member 634.

The hybrid transmission 614 receives power from the engine 12, and also exchanges power with an electric power source 686, which is operably connected to a controller 688.

Description of an Eighth Exemplary Embodiment

Figure 8:
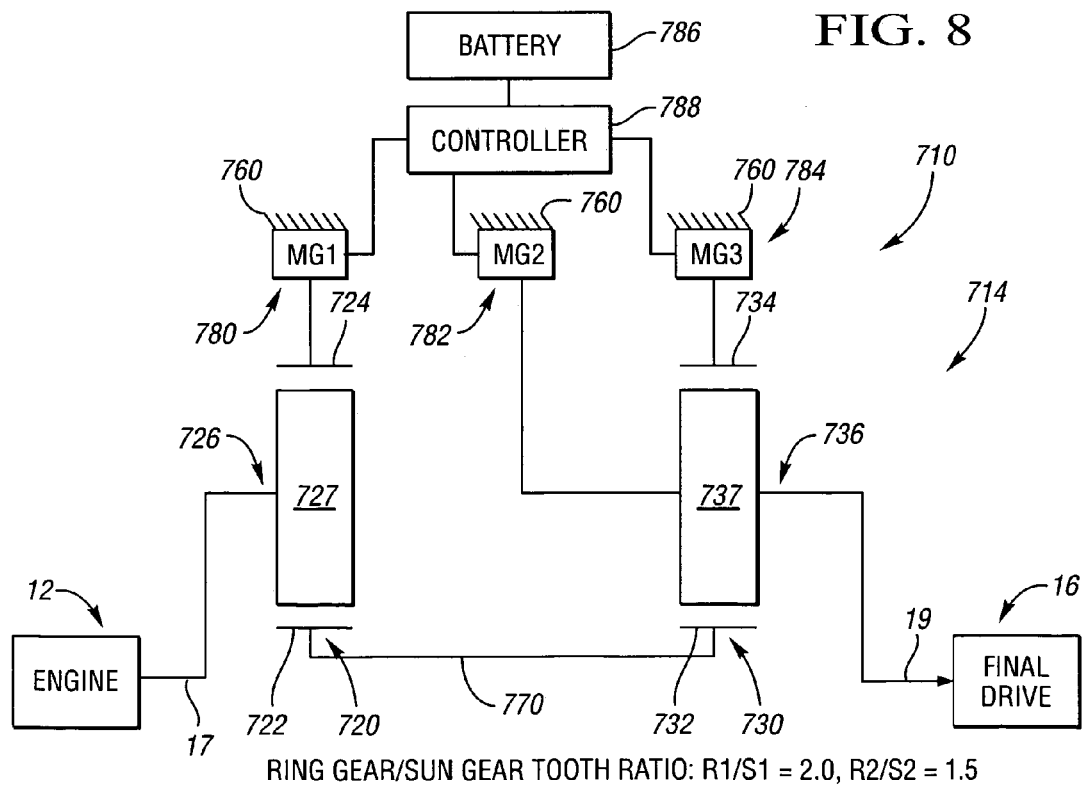
FIG. 8 is a schematic representation of a powertrain of an eighth embodiment including an electrically variable transmission incorporating a family member of the present invention.

With reference to FIG. 8, a powertrain 710 is shown, including an engine 12 connected to one preferred embodiment of the improved electrically variable transmission (EVT), designated generally by the numeral 714. Transmission 714 is designed to receive at least a portion of its driving power from the engine 12. As shown, the engine 12 has an output shaft that serves as the input member 17 of the transmission 714. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 714. An output member 19 of the transmission 714 is connected to a final drive 16.

The transmission 714 utilizes two differential gear sets, preferably in the nature of planetary gear sets 720 and 730. The planetary gear set 720 employs an outer gear member 724, typically designated as the ring gear. The ring gear member 724 circumscribes an inner gear member 722, typically designated as the sun gear. A carrier member 726 rotatably supports a plurality of planet gears 727 such that each planet gear 727 simultaneously, and meshingly engages both the outer, ring gear member 724 and the inner, sun gear member 722 of the planetary gear set 720.

The planetary gear set 730 also employs an outer gear member 734, typically designated as the ring gear. The ring gear member 734 circumscribes an inner gear member 732, typically designated as the sun gear. A carrier member 736 rotatably supports a plurality of planet gears 737 such that each planet gear 737 simultaneously, and meshingly engages both the outer, ring gear member 734 and the inner, sun gear member 732 of the planetary gear set 730.

The input shaft 17 is continuously connected to the carrier member 726. The output shaft 19 is continuously connected to the carrier member 736.

An interconnecting member 770 continuously connects the sun gear member 722 with the sun gear member 732.

The preferred embodiment 710 also incorporates first, second and third motor/generators 780, 782 and 784, respectively. The stator of the first motor/generator 780 is secured to the transmission housing 760. The rotor of the first motor/generator 780 is secured to the ring gear member 724.

The stator of the second motor/generator 782 is secured to the transmission housing 760. The rotor of the second motor/generator 782 is secured to the carrier member 736, and therefore the output member 19.

The stator of the third motor/generator 784 is secured to the transmission housing 760. The rotor of the third motor/generator 784 is secured to the ring gear member 734.

The hybrid transmission 714 receives power from the engine 12, and also exchanges power with an electric power source 786, which is operably connected to a controller 788.

Description of a Ninth Exemplary Embodiment

Figure 9:
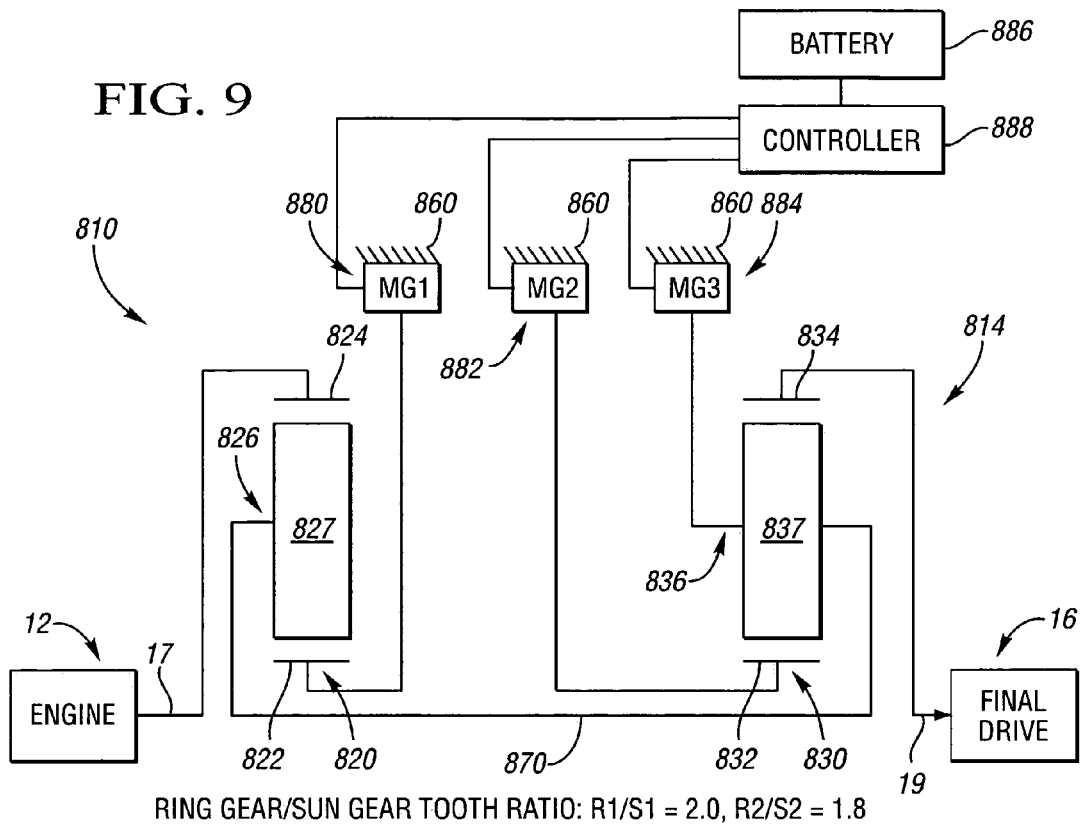
FIG. 9 is a schematic representation of a powertrain of a ninth embodiment including an electrically variable transmission incorporating a family member of the present invention.

With reference to FIG. 9, a powertrain 810 is shown, including an engine 12 connected to one preferred embodiment of the improved electrically variable transmission (EVT), designated generally by the numeral 814. Transmission 814 is designed to receive at least a portion of its driving power from the engine 12. As shown, the engine 12 has an output shaft that serves as the input member 17 of the transmission 814. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 814. An output member 19 of the transmission 814 is connected to a final drive 16.

The transmission 814 utilizes two differential gear sets, preferably in the nature of planetary gear sets 820 and 830. The planetary gear set 820 employs an outer gear member 824, typically designated as the ring gear. The ring gear member 824 circumscribes an inner gear member 822, typically designated as the sun gear. A carrier member 826 rotatably supports a plurality of planet gears 827 such that each planet gear 827 simultaneously, and meshingly engages both the outer, ring gear member 824 and the inner, sun gear member 822 of the planetary gear set 820.

The planetary gear set 830, also employs an outer gear member 834, typically designated as the ring gear. The ring gear member 834 circumscribes an inner gear member 832, typically designated as the sun gear. A carrier member 836 rotatably supports a plurality of planet gears 837 such that each planet gear 837 simultaneously, and meshingly engages both the outer, ring gear member 834 and the inner, sun gear member 832 of the planetary gear set 830.

The input shaft 17 is continuously connected to the ring gear member 824. The output shaft 19 is continuously connected to the ring gear member 834.

An interconnecting member 870 continuously connects the carrier member 826 with the carrier member 836.

The preferred embodiment 810 also incorporates first, second and third motor/generators 880, 882 and 884, respectively. The stator of the first motor/generator 880 is secured to the transmission housing 860. The rotor of the first motor/generator 880 is secured to the sun gear member 822.

The stator of the second motor/generator 882 is secured to the transmission housing 860. The rotor of the second motor/generator 882 is secured to the sun gear member 832.

The stator of the third motor/generator 884 is secured to the transmission housing 860. The rotor of the third motor/generator 884 is secured to the carrier member 836.

The hybrid transmission 814 receives power from the engine 12, and also exchanges power with an electric power source 886, which is operably connected to a controller 888.

Description of a Tenth Exemplary Embodiment

Figure 10:
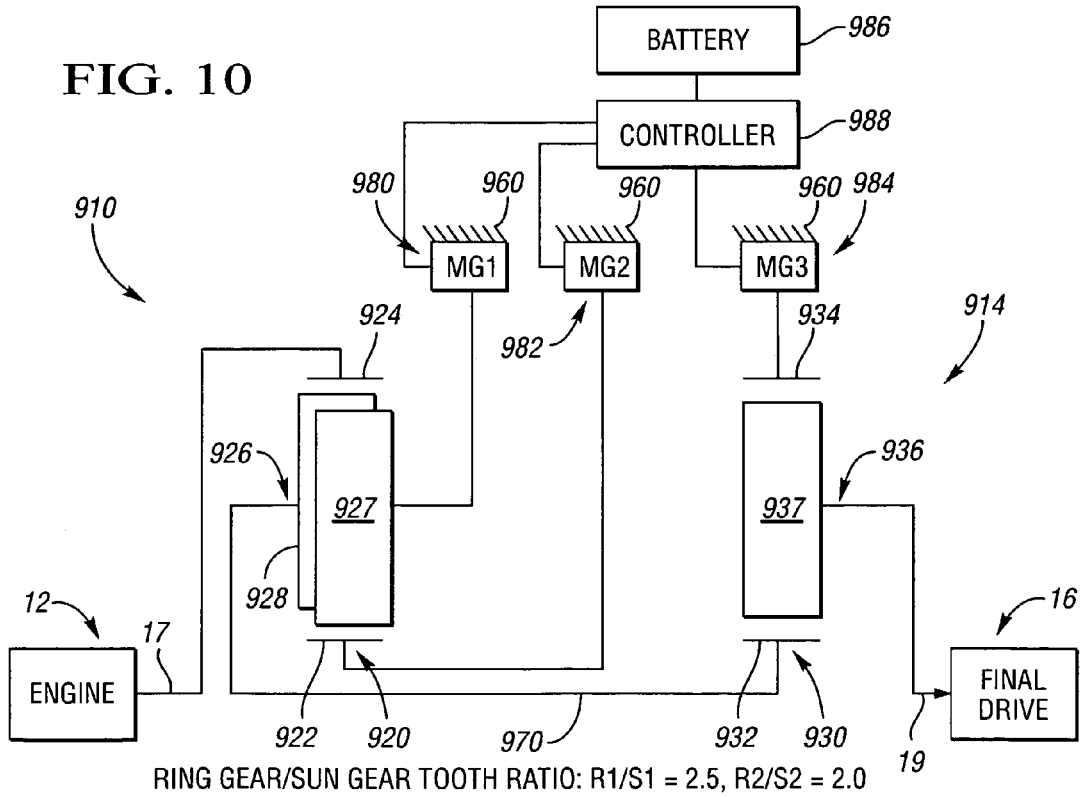
FIG. 10 is a schematic representation of a powertrain of a tenth embodiment including an electrically variable transmission incorporating a family member of the present invention.

With reference to FIG. 10, a powertrain 910 is shown, including an engine 12 connected to one preferred embodiment of the improved electrically variable transmission (EVT), designated generally by the numeral 914. Transmission 914 is designed to receive at least a portion of its driving power from the engine 12. As shown, the engine 12 has an output shaft that serves as the input member 17 of the transmission 914. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 914. An output member 19 of the transmission 914 is connected to a final drive 16.

The transmission 914 utilizes two differential gear sets, preferably in the nature of planetary gear sets 920 and 930. The planetary gear set 920 employs an outer gear member 924, typically designated as the ring gear. The ring gear member 924 circumscribes an inner gear member 922, typically designated as the sun gear. A carrier member 926 rotatably supports a plurality of planet gears 927, 928. Each planet gear 927 meshingly engages sun gear member 922 and each planet gear 928 meshingly engages the ring gear member 924 and the respective planet gear 927 of the planetary gear set 920.

The planetary gear set 930 employs an outer gear member 934, typically designated as the ring gear. The ring gear member 934 circumscribes an inner gear member 932, typically designated as the sun gear. A carrier member 936 rotatably supports a plurality of planet gears 937 such that each planet gear 937 simultaneously, and meshingly engages both the outer, ring gear member 934 and the inner, sun gear member 932 of the planetary gear set 930.

The input shaft 17 is continuously connected to the ring gear member 924. The output shaft 19 is continuously connected to the carrier member 936.

An interconnecting member 970 continuously connects the carrier member 926 with the sun gear member 932.

The preferred embodiment 910 also incorporates first, second and third motor/generators 980, 982 and 984, respectively. The stator of the first motor/generator 980 is secured to the transmission housing 960. The rotor of the first motor/generator 980 is secured to the carrier member 926.

The stator of the second motor/generator 982 is secured to the transmission housing 960. The rotor of the second motor/generator 982 is secured to the sun gear member 922.

The stator of the third motor/generator 984 is secured to the transmission housing 960. The rotor of the third motor/generator 984 is secured to the ring gear member 934.

The hybrid transmission 914 receives power from the engine 12, and also exchanges power with an electric power source 986, which is operably connected to a controller 988.

Description of an Eleventh Exemplary Embodiment

Figure 11:
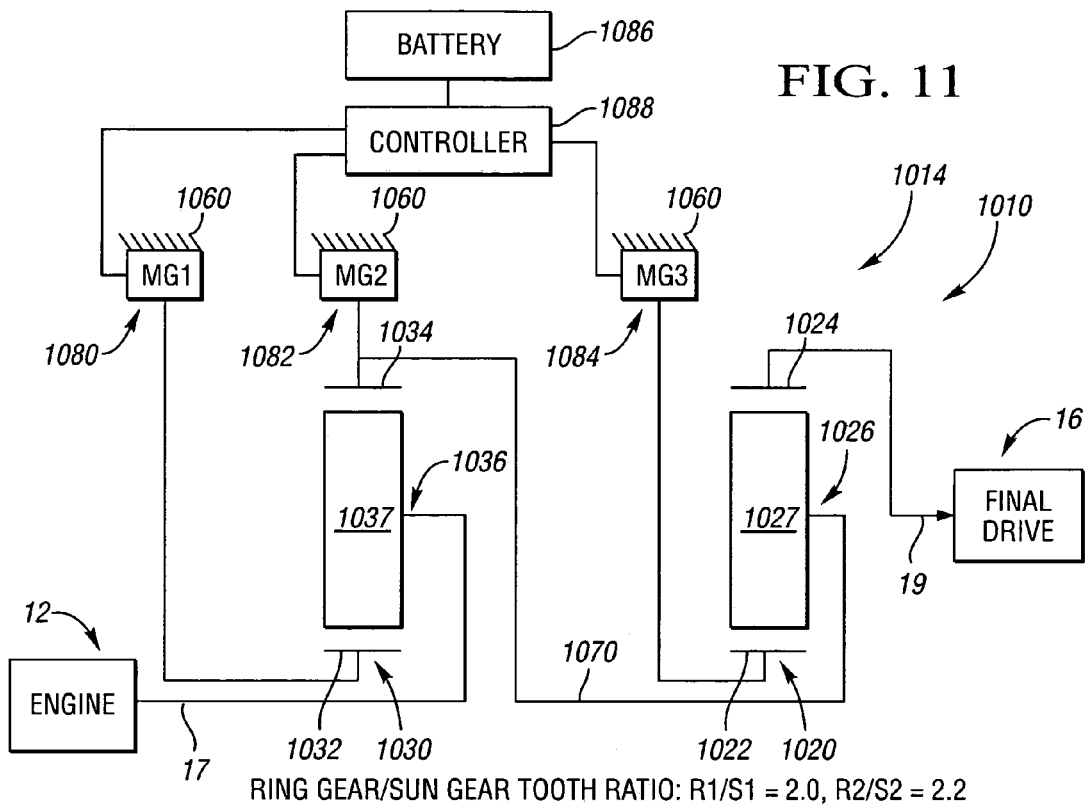
FIG. 11 is a schematic representation of a powertrain of an eleventh embodiment including an electrically variable transmission incorporating a family member of the present invention.

With reference to FIG. 11, a powertrain 1010 is shown, including an engine 12 connected to one preferred embodiment of the improved electrically variable transmission (EVT), designated generally by the numeral 1014. Transmission 1014 is designed to receive at least a portion of its driving power from the engine 12. As shown, the engine 12 has an output shaft that serves as the input member 17 of the transmission 1014. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 1014. An output member 19 of the transmission 1014 is connected to a final drive 16.

The transmission 1014 utilizes two differential gear sets, preferably in the nature of planetary gear sets 1020 and 1030. The planetary gear set 1020 employs an outer gear member 1024, typically designated as the ring gear. The ring gear member. 1024 circumscribes an inner gear member 1022, typically designated as the sun gear. A carrier member 1026 rotatably supports a plurality of planet gears 1027 such that each planet gear 1027 simultaneously, and meshingly engages both the outer, ring gear member 1024 and the inner, sun gear member 1022 of the planetary gear set 1020.

The planetary gear set 1030 employs an outer gear member 1034, typically designated as the ring gear. The ring gear member 1034 circumscribes an inner gear member 1032, typically designated as the sun gear. A carrier member 1036 rotatably supports a plurality of planet gears 1037 such that each planet gear 1037 simultaneously, and meshingly engages both the outer, ring gear member 1034 and the inner, sun gear member 1032 of the planetary gear set 1030.

The input shaft 17 is continuously connected to the carrier member 1036. The output shaft 19 is continuously connected to the ring gear member 1024.

An interconnecting member 1070 continuously connects the carrier member 1026 with the ring gear member 1034.

The preferred embodiment 1010 also incorporates first, second and third motor/generators 1080, 1082 and 1084, respectively. The stator of the first motor/generator 1080 is secured to the transmission housing 1060. The rotor of the first motor/generator 1080 is secured to the sun gear member 1032.

The stator of the second motor/generator 1082 is secured to the transmission housing 1060. The rotor of the second motor/generator 1082 is secured to the ring gear member 1034.

The stator of the third motor/generator 1084 is secured to the transmission housing 1060. The rotor of the third motor/generator 1084 is secured to the sun gear member 1022.

The hybrid transmission 1014 receives power from the engine 12, and also exchanges power with an electric power source 1086, which is operably connected to a controller 1088.

Description of a Twelfth Exemplary Embodiment

Figure 12:
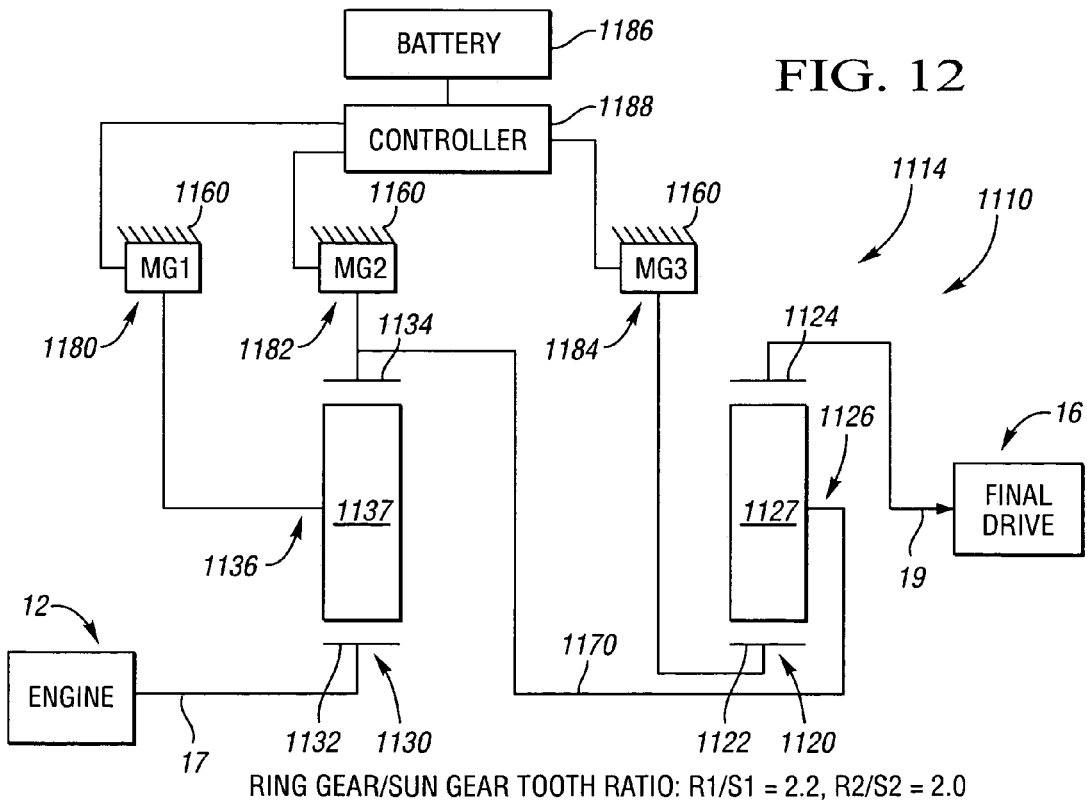
FIG. 12 is a schematic representation of a powertrain of a twelfth embodiment including an electrically variable transmission incorporating a family member of the present invention.

With reference to FIG. 12, a powertrain 1110 is shown, including an engine 12 connected to one preferred embodiment of the improved electrically variable transmission (EVT), designated generally by the numeral 1114. Transmission 1114 is designed to receive at least a portion of its driving power from the engine 12. As shown, the engine 12 has an output shaft that serves as the input member 17 of the transmission 1114. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 1114. An output member 19 of the transmission 1114 is connected to a final drive 16.

The transmission 1114 utilizes two differential gear sets, preferably in the nature of planetary gear sets 1120 and 1130. The planetary gear set 1120 employs an outer gear member 1124, typically designated as the ring gear. The ring gear member 1124 circumscribes an inner gear member 1122, typically designated as the sun gear. A carrier member 1126 rotatably supports a plurality of planet gears 1127 such that each planet gear 1127 simultaneously, and meshingly engages both the outer, ring gear member 1124 and the inner, sun gear member 1122 of the planetary gear set 1120.

The planetary gear set 1130 employs an outer gear member 1134, typically designated as the ring gear. The ring gear member 1134 circumscribes an inner gear member 1132, typically designated as the sun gear. A carrier member 1136 rotatably supports a plurality of planet gears 1137 such that each planet gear 1137 simultaneously, and meshingly engages both the outer, ring gear member 1134 and the inner, sun gear member 1132 of the planetary gear set 1130.

The input shaft 17 is continuously connected to the sun gear member 1132. The output shaft 19 is continuously connected to the ring gear member 1124.

An interconnecting member 1170 continuously connects the carrier member 1126 with the ring gear member 1134.

The preferred embodiment 1110 also incorporates first, second and third motor/generators 1180, 1182 and 1184, respectively. The stator of the first motor/generator 1180 is secured to the transmission housing 1160. The rotor of the first motor/generator 1180 is secured to the carrier member 1136.

The stator of the second motor/generator 1182 is secured to the transmission housing 1160. The rotor of the second motor/generator 1182 is secured to the ring gear member 1134.

The stator of the third motor/generator 1184 is secured to the transmission housing 1160. The rotor of the third motor/generator 1184 is secured to the sun gear member 1122.

The hybrid transmission 1114 receives power from the engine 12, and also exchanges power with an electric power source 1186, which is operably connected to a controller 1188.

Description of a Thirteenth Exemplary Embodiment

Figure 13:
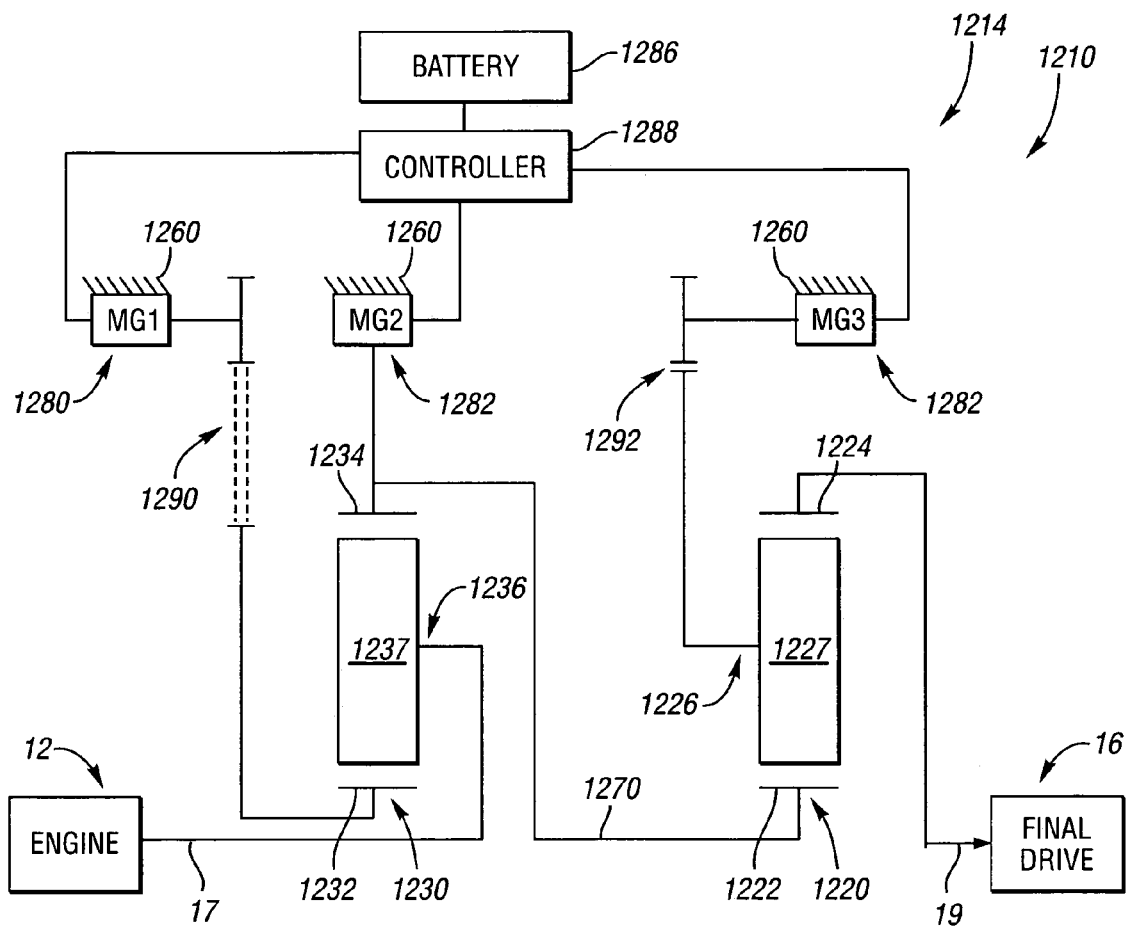
FIG. 13 is a schematic representation of a powertrain of a thirteenth embodiment including an electrically variable transmission incorporating a family member of the present invention.

With reference to FIG. 13, a powertrain 1210 is shown, including an engine 12 connected to one preferred embodiment of the improved electrically variable transmission (EVT), designated generally by the numeral 1214. Transmission 1214 is designed to receive at least a portion of its driving power from the engine 12. As shown, the engine 12 has an output shaft that serves as the input member 17 of the transmission 1214. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 1214. An output member 19 of the transmission 1214 is connected to a final drive 16.

The transmission 1214 utilizes two differential gear sets, preferably in the nature of planetary gear sets 1220 and 1230. The planetary gear set 1220 employs an outer gear member 1224, typically designated as the ring gear. The ring gear member 1224 circumscribes an inner gear member 1222, typically designated as the sun gear. A carrier member 1226 rotatably supports a plurality of planet gears 1227 such that each planet gear 1227 simultaneously, and meshingly engages both the outer, ring gear member 1224 and the inner, sun gear member 1222 of the planetary gear set 1220.

The planetary gear set 1230 employs an outer gear member 1234, typically designated as the ring gear. The ring gear member 1234 circumscribes an inner gear member 1232, typically designated as the sun gear. A carrier member 1236 rotatably supports a plurality of planet gears 1237 such that each planet gear 1237 simultaneously, and meshingly engages both the outer, ring gear member 1234 and the inner, sun gear member 1232 of the planetary gear set 1230.

The input shaft 17 is continuously connected to the carrier member 1236. The output shaft 19 is continuously connected to the ring gear member 1224.

An interconnecting member 1270 continuously connects the sun gear member 1222 with the ring gear member 1234.

The preferred embodiment 1210 also incorporates first, second and third motor/generators 1280, 1282 and 1284, respectively. The stator of the first motor/generator 1280 is secured to the transmission housing 1260. The rotor of the first motor/generator 1280 is secured to the sun gear member 1232 via an offset drive 1290, such as a belt or chain, which may change the speed ratio.

The stator of the second motor/generator 1282 is secured to the transmission housing 1260. The rotor of the second motor/generator 1282 is secured to the ring gear member 1234.

The stator of the third motor/generator 1284 is secured to the transmission housing 1260. The rotor of the third motor/generator 1284 is secured to the carrier member 1226 via an offset gear 1292.

The hybrid transmission 1214 receives power from the engine 12, and also exchanges power with an electric power source 1286, which is operably connected to a controller 1288.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:
   an input member to receive power from an engine;
   an output member, said transmission having no more than one output member;
   first, second and third motor/generators;
   first and second differential gear sets each having first, second and third members;
   said input member being continuously connected with a member of said gear sets, and said output member being continuously connected with another member of said gear sets;
   an interconnecting member continuously connecting said first member of said first gear set with said first member of said second gear set, said transmission having no more than one interconnecting member between said first gar set and said second gear set;
   said first motor/generator being continuously connected with a member of said first gear set;
   said second motor/generator being continuously connected with a member of said second gear set;
   said third motor/generator being continuously connected with a member of said first or second gear set;
   wherein none of said first, second and third motor/generators are directly connected with said input member;
   wherein none of said first, second, and third motor/generators are directly connected with said output member; and
   wherein said first, second and third motor/generators are operable to provide an electrically variable transmission with a continuously variable range of speed ratios between said input member and said output member.

2. The electrically variable transmission of claim 1, wherein said first and second differential gear sets are planetary gear sets.

3. The electrically variable transmission of claim 2, wherein the first, second and third members of the respective first and second planetary gear sets include respective planet carrier assembly members; and
   wherein both of said respective planet carrier assembly members of said planetary gear sets are single-pinion carriers.

4. The electrically variable transmission of claim 2, wherein the first, second and third members of the respective first and second planetary gear sets include respective planet carrier assembly members; and
   wherein at least one of said respective planet carrier assembly members of said planetary gear sets is a double-pinion carrier.

5. The electrically variable transmission of claim 1, wherein at least one of said motor/generators is connected with said gear sets through at least one fixed or variable speed ratio device.

6. The electrically variable transmission of claim 1, wherein the electrically variable transmission is characterized by the absence of clutches.

7. The electrically variable transmission of claim 1, wherein at least one of said motor/generators is connected with said output member through at least one of said members of the first, second and third gear sets.

8. An electrically variable transmission comprising:
   an input member to receive power from an engine;
   an output member, said transmission having no more than one output member,
   first, second and third motor/generators;
   first and second differential gear sets each having first, second and third members;
   said input member being continuously connected with a member of said gear sets, and said output member being continuously connected with another member of said gear sets;
   an interconnecting member continuously connecting said first member of said first gear set with said first member of said second gear set, said transmission having no more than one interconnecting member between said first gear set and said second gear set;
   said first, second and third motor/generators being continuously connected with members of said gear sets;
   wherein none of said first, second and third motor/generators are directly connected with said input member;
   wherein none of said first, second, and third motor/generators are directly connected with said output member; and
   wherein said first, second and third motor/generators are operable to provide an electrically variable transmission with a continuously variable range of speed ratios between said input member and said output member.

9. The electrically variable transmission of claim 8, wherein said first and second differential gear sets are planetary gear sets.

10. The electrically variable transmission of claim 9, wherein the first, second and third members of the respective first and second differential gear sets include respective planet carrier assembly members; and wherein both of said respective planet carrier assembly members of said planetary gear sets are single-pinion carriers.

11. The electrically variable transmission of claim 9, wherein the first, second and third members of the respective first and second differential gear sets include respective planet carrier assembly members; and wherein at least one of said respective planet carrier assembly members of said planetary gear sets is a double-pinion carrier.

12. The electrically variable transmission of claim 8, wherein at least one of said motor/generators is connected with said gear sets through at least one fixed or variable speed ration device.

13. The electrically variable transmission of claim 8, wherein said input member and at least one of said motor/generators are connected with said first differential gear set.

14. The electrically variable transmission of claim 8, wherein said input member and at least two of said motor/generators are connected with said first differential gear set.

15. The electrically variable transmission of claim 8, wherein one of said input member and said output member is connected with said interconnecting member.

16. The electrically variable transmission of claim 8, wherein said input member and said output member are each connected with different respective members of one of said differential gear sets.

17. The electrically variable transmission of claim 8, wherein said input member is connected with a member of said first differential gear set and said output member is connected with a member of said second differential gear set.

18. The electrically variable transmission of claim 8, wherein none of said members of said gear sets are connected to a stator of one of said motor/generators.

19. The electrically variable transmission of claim 8, wherein none of said members of said gear sets are connected to a stationary member.

* * * * *